May 20, 1924.
T. G. STILES
PISTON
Filed June 9, 1922
1,494,822
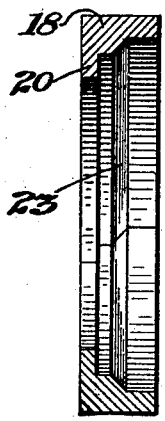
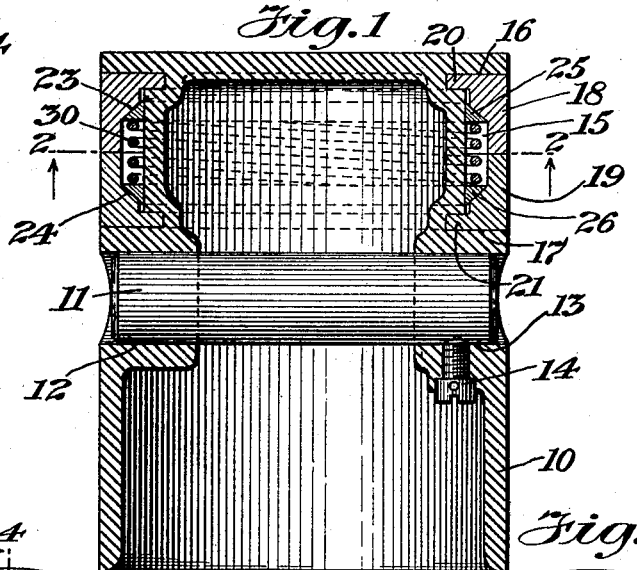
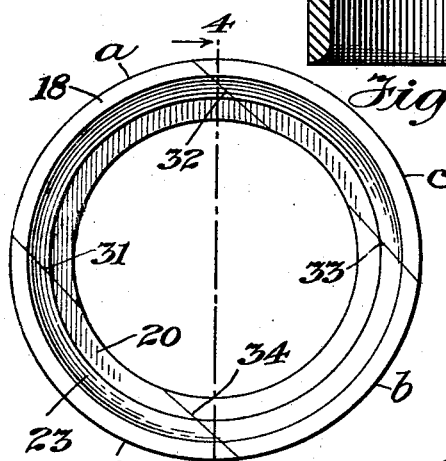
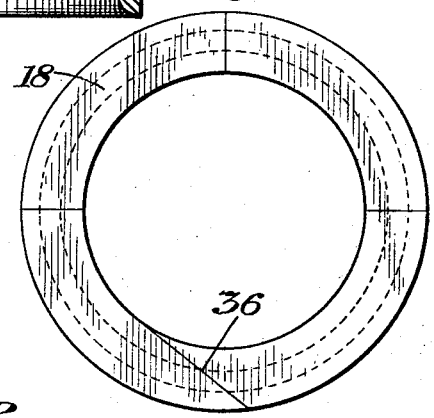
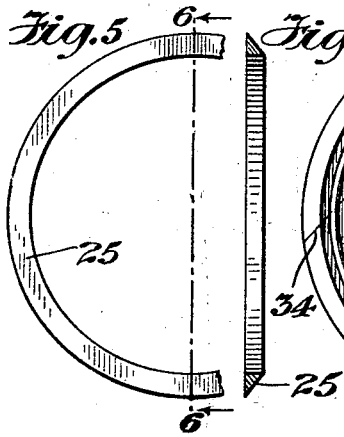
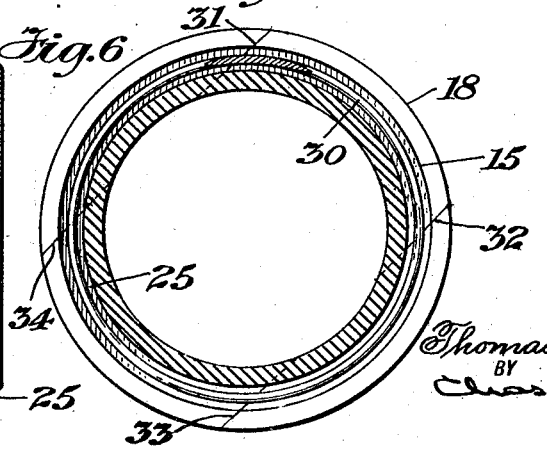
INVENTOR
Thomas George Stiles
BY
HIS ATTORNEY Patented May 20, 1924.

1,494,822

UNITED STATES PATENT OFFICE.

THOMAS GEORGE STILES, OF ARLINGTON, NEW JERSEY.

PISTON.

Application filed June 9, 1922. Serial No. 566,947.

*To all whom it may concern:*

Be it known that I, THOMAS GEORGE STILES, a citizen of the United States, and a resident of Arlington, in the county of Hudson and State of New Jersey, have invented certain new and useful Improvements in Pistons, of which the following is a specification.

This invention relates to pistons and particularly to piston-rings and the means for mounting them in the piston-blocks.

One object of the invention is to provide a piston-ring having improved means for permitting automatic expansion and contraction thereof.

A further object of the invention is to provide improved means for insuring effective functioning of the piston-ring at all times regardless of the condition of wear of said ring or the contour of the inner surface of the piston cylinder.

Other objects and advantages will hereinafter appear.

In the accompanying drawings:

Figure 1 is a vertical section of a piston having a pair of my improved piston-rings mounted therein.

Fig. 2 is a section taken on the line 2—2 of Fig. 1.

Fig. 3 is an end view of one of the piston-rings.

Fig. 4 is a section taken on the line 4—4 of Fig. 3.

Fig. 5 is a plan view of a portion of a circular wedge.

Fig. 6 is a section taken on the line 6—6 of Fig. 5, and

Fig. 7 is an end view of a modified form of piston-ring, looking from the end opposite that shown in Fig. 3.

Referring to the drawings, there is shown a piston-block 10, provided with the usual wrist-pin 11 held in seats 12 and 13 in opposite walls of the block by a set-screw 14. The upper end of the block is provided with a circumferential groove or recess 15 within which are seated a pair of expansible piston-rings 18 and 19 having at one end right-angular flanges 20 and 21, respectively. These piston-rings are oppositely disposed relatively to each other, so that the flanges 20 and 21 occupy the extreme ends of the recess 15 in contact with end walls 16 and 17 thereof, as shown.

In order to keep the outer surfaces of the piston-rings pressed firmly against the wall of the cylinder at all times, the rings are provided at their inner sides with inclined surfaces 23 and 24, with which cooperate annular wedges 25 and 26 positioned in the recess 15 between the rings and the piston-body. The wedges 25 and 26 have oppositely located flat bases against which press the opposite ends of a coil spring 30 positioned, like the annular wedges, in the recess 15 between the rings and the piston-body. As the surfaces 23 and 24 at the inner side of the rings with which the wedges cooperate are oppositely inclined relatively to each other, it will be apparent that the spring 30, expanding in the direction of the axis of the piston, will drive the annular wedges 25 and 26 between the piston-body and the rings to force the latter outwardly into firm contact with the wall of the piston cylinder.

To permit of ready and uniform expansion of the rings as well as to permit of their being readily seated in or removed from the recess 15 in the block 10, the rings are constructed in a plurality of parts. For example, referring to Fig. 3, the ring is shown as divided into four parts, the meeting-edges of the parts being indicated at 31, 32, 33 and 34. To facilitate expansion and contraction of the rings, said meeting-edges are preferably so inclined to the radii drawn to these edges that the various parts of the ring will ride inwardly or outwardly upon the inclined ends of the adjacent parts for contraction or expansion, as determined by the inner wall of the cylinder in which the piston operates or by the condition of wear of the rings, or by various other conditions. For example, referring particularly to Fig. 3, it will be noted that the two oppositely located ring parts *a* and *b* are each slightly wedge-shaped, with the wide end or base of the wedge at the inner side of the ring, whereby, upon expansion of the ring as permitted by wear of the parts, the outward movement of the parts *a* and *b* will act to cause an outward movement of the other engaging parts *c* and *d*.

If desired. all the contraction or expansion may take place at one meeting edge only, this being effected by inclining only one of the meeting edges with respect to the radii drawn to said edge, while the remaining meeting edges are radial, as shown in Fig. 7, in which the inclined edge is indicated at 36.

In operation, the coil-spring 30 presses the annular wedges against the inclined surfaces of the rings to force the latter outwardly against the wall of the cylinder in which the piston operates. Any contraction or expansion of the rings due to various conditions which may arise will be automatically taken up by the relatively movable parts of the rings.

The above description represents a preferred embodiment of my invention, but it will be understood that various changes may be made within the scope of the annexed claims.

What I claim is:—

1. In combination with a piston-block having an annular recess, a pair of piston-rings each comprising a plurality of parts mounted in said recess, and each having an inner inclined surface, annular wedges positioned in said recess between said inclined surfaces and the piston-block, and a coil-spring positioned in said recess between said rings, encircling the piston-block and engaging said annular wedges to render the latter effective to press the rings into engagement with the end walls of said recess in the piston-block and outwardly.

2. In combination with a piston-block having an annular recess, a pair of piston-rings each comprising a plurality of parts mounted in said recess, the meeting-edges of said parts being inclined with respect to radii drawn to said edges to permit expansion and contraction of said rings, said rings each having an inner inclined surface, annular wedges positioned in said recess between said inclined surfaces and the piston-block, and a coil-spring positioned in said recess between the rings, encircling the piston-block and engaging said annular wedges to render the latter effective to press said rings into engagement with the end walls of said recess in the piston-block and outwardly.

THOMAS GEORGE STILES.